United States Patent
Mandoux et al.

(10) Patent No.: US 11,356,042 B2
(45) Date of Patent: Jun. 7, 2022

(54) METHOD OF CONTROLLING A BRUSHLESS DC MOTOR

(71) Applicant: Delphi Automotive Systems Luxembourg SA, Bascharage (LU)

(72) Inventors: Felix Mandoux, Hettange-Grande (FR); Georges Wachter, Luxembourg (LU)

(73) Assignee: Delphi Automotive Systems Luxembourg SA, Bascharage (LU)

( * ) Notice: Subject to any disclaimer, the term of this patent is extended or adjusted under 35 U.S.C. 154(b) by 40 days.

(21) Appl. No.: 16/645,235

(22) PCT Filed: Aug. 31, 2018

(86) PCT No.: PCT/EP2018/073466
§ 371 (c)(1),
(2) Date: Mar. 6, 2020

(87) PCT Pub. No.: WO2019/048349
PCT Pub. Date: Mar. 14, 2019

(65) Prior Publication Data
US 2020/0373861 A1   Nov. 26, 2020

(30) Foreign Application Priority Data
Sep. 7, 2017   (GB) .................................. 1714416

(51) Int. Cl.
*H02P 6/15*   (2016.01)
*H02P 6/18*   (2016.01)
*H02P 6/08*   (2016.01)

(52) U.S. Cl.
CPC ................ *H02P 6/153* (2016.02); *H02P 6/08* (2013.01); *H02P 6/18* (2013.01)

(58) Field of Classification Search
CPC ............... H02P 6/153; H02P 6/08; H02P 6/18
USPC .................................................... 318/400.01
See application file for complete search history.

(56) References Cited

U.S. PATENT DOCUMENTS

| 6,774,592 | B2 | 8/2004 | Walters et al. |
| 2003/0102829 | A1 | 6/2003 | Walters et al. |
| 2005/0031322 | A1 | 2/2005 | Boyle et al. |
| 2012/0049777 | A1* | 3/2012 | Kern ........................ H02P 6/16 318/400.35 |
| 2014/0062364 | A1 | 3/2014 | Petri et al. |

(Continued)

FOREIGN PATENT DOCUMENTS

| CN | 202495903 U | 10/2012 | |
| DE | 102015224560 A1 | 6/2017 | |
| EP | 1874669 A1 * | 1/2008 | ............ B60L 15/025 |

(Continued)

*Primary Examiner* — Jorge L Carrasquillo
(74) *Attorney, Agent, or Firm* — Joshua M. Haines; Bookoff McAndrews, PLLC

(57) ABSTRACT

A method of controlling the commutation of a brushless direct current motor includes providing sensors which provide a variable output dependent on rotational angle or the relative position of the stator and rotor of the motor. Output from the sensors is sampled at a time between a past commutation event and the next commutation event to be implemented. An angular position between the rotor and stator is determined at the time. The time of the next commutation event is determined based on the next commutation angle, motor speed, and the determined angular position.

14 Claims, 4 Drawing Sheets

(56) References Cited

U.S. PATENT DOCUMENTS

2017/0163185 A1     6/2017   Gohmert et al.
2019/0326837 A1*   10/2019   Fujishima ............... H02P 21/22

FOREIGN PATENT DOCUMENTS

| EP | 2704305 | A2 | | 3/2014 | |
|---|---|---|---|---|---|
| JP | 2012165493 | A | * | 8/2012 | |
| WO | 2005016217 | A2 | | 2/2005 | |
| WO | 2006094524 | A1 | | 9/2006 | |
| WO | WO-2009128268 | A1 | * | 10/2009 | ............... H02P 6/15 |

* cited by examiner

METHOD OF CONTROLLING A BRUSHLESS DC MOTOR

CROSS REFERENCE TO RELATED APPLICATIONS

This application is a national stage application under 35 USC 371 of PCT Application No. PCT/EP2018/073466 having an international filing date of Aug. 31, 2018, which is designated in the United States and which claimed the benefit of GB Patent Application No. 1714416.3 filed on Sep. 7, 2017, the entire disclosures of each are hereby incorporated by reference in their entirety.

TECHNICAL FIELD

The invention relates to a method and apparatus for controlling a brushless DC motor, and has particular application to controlling the commutation thereof.

BACKGROUND OF THE INVENTION

Brushless Direct Current (BLDC) motors are commonly used for direct current automotive motor applications. Their rotor is equipped with a permanent magnet creating the excitation field. The stator consists of (e.g. three phase) windings supplied by an inverter with current. The commutation of such motors is handled by an inverter and its controlling logics. Several commutation patterns are used in industry, most of the time so called sine commutation and block commutation.

The commutation logics/control require the actual motor position in order to operate the motor correctly, i.e. apply correct commutation timing. Common known implementations of commutation are based on various methods and hardware, depending on the mechanical design of the motor.

In one example, a number (e.g. three) discrete Hall sensors may be used to sense relative rotor to stator position and trigger the next block commutation pattern. The disadvantage in this is that it only provides a very low position rotor resolution (6 increments per electrical rotation) which would not allow doing high precision position control by switching to sine commutation.

Alternatively complex intelligent sensors emulating the e.g. three Hall sensor signals described above or another event type output (e.g. incremental interface) data can allow for the derivation of the commutation event from the sensor position. However this solution requires complex and expensive sensors.

In another method, a linear position sensor with continuous output is used; the output from which is used to directly derive the commutation time. However this has very weak precision due to processing time and jitter.

Alternatively sensorless BLDC motor control can be performed by analyzing and extrapolation from the back EMF zero-crossing event to determine the commutation time. However this does not operate well at low speed and is limited to block commutation.

It is an object of the invention to provide an improved method and apparatus of controlling commutation in BLDC.

SUMMARY OF THE INVENTION

In one aspect is provided a method of controlling the commutation of a brushless direct current motor (BLDC) comprising: a) providing one or more sensors, said sensors adapted to provide a variable output dependent on the rotational angle of the motor or the relative position of the stator and rotor of the motor; b) sampling the output from said sensor(s) signals at a time $t_n$ between a past commutation event $C_{m-1}$ and the next commutation event $C_m$ to be implemented; c) determining an angular position $\alpha_n$ between rotor and stator at time $t_n$ at said time since the last commutation event from step b); d) determining the time $T_m$ of next commutation event Cm based on commutation the next commutation angle (Cm), motor speed ω, and output from step c).

Said time Tm is determined from the equation $T_m = t_n + (C_{m,angle} - \alpha_n)\omega$ where $\alpha_n$ is the angular position at time tn calculated from step c), ω is the determined or modelled rotational speed, and $C_{m,angle}$ is the angle of the next commutation event.

The speed of the motor w is determined by determining the angular change in rotation of the motor from the sensor output at two or more known time instances (tn, tn−1).

The speed ω may is determined from a model of the motor.

BRIEF DESCRIPTION OF THE DRAWINGS

The present invention is now described by way of example with reference to the accompanying drawings in which.

DESCRIPTION OF THE PREFERRED EMBODIMENTS

The present invention provides a method to control BDC motors using simple linear sensors whilst but achieving optimal commutation timing.

Figure 1:
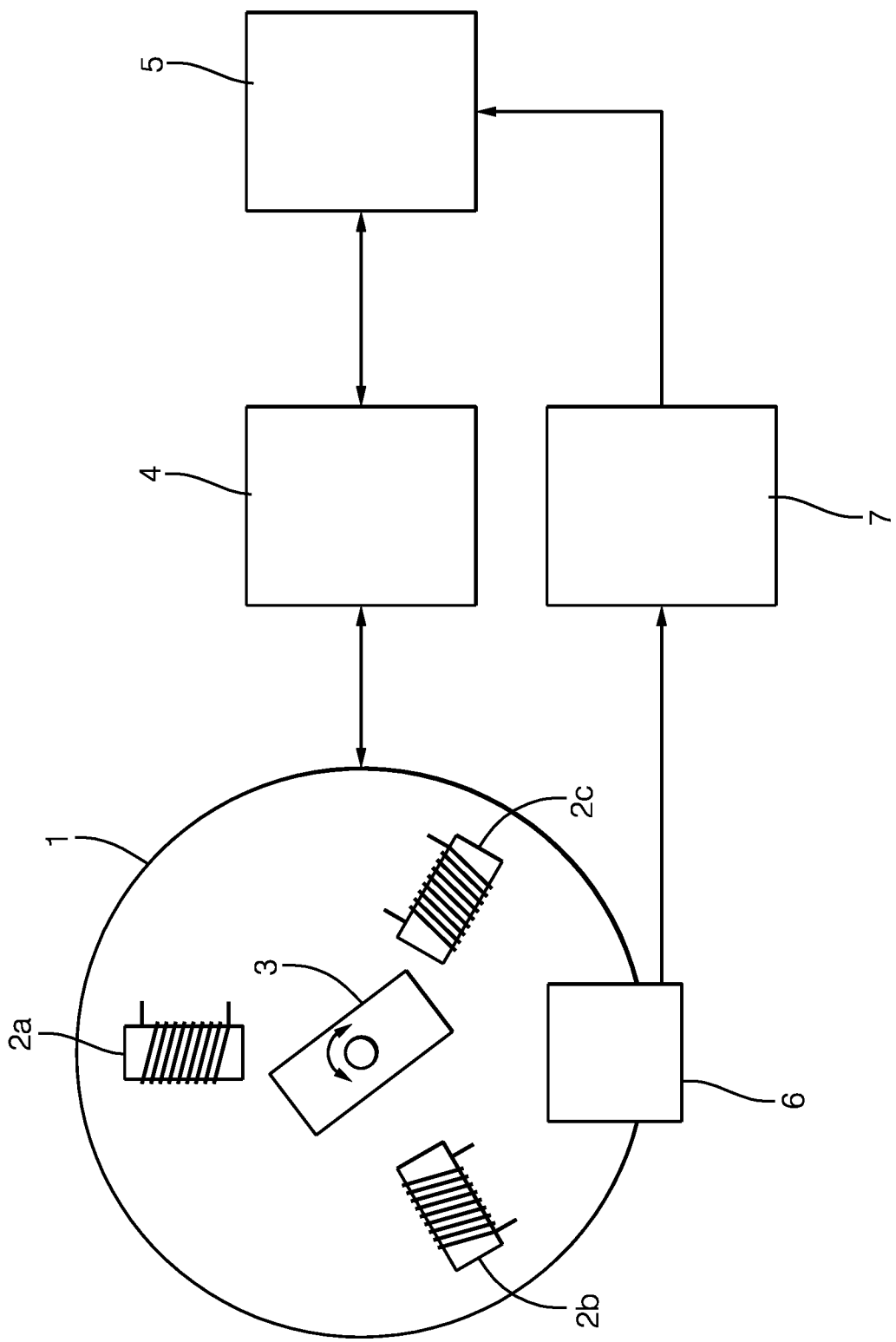
FIG. 1 shows common BLDC motor control.

FIG. 1 shows common BLDC motor control apparatus including a schematic representation of the BLDC motor 1 itself. The rotor of the brushless motor is equipped with a permanent magnet 3, creating an excitation field. The stator here consists of three phase windings: 2a, 2b, and 2c, supplied with current from an inverter 4. The commutation is handled by the inverter and its controlling logic circuitry 5. Several commutation patterns are used in industry, most of the time so called sine commutation and block commutation. In known techniques, the raw position of the rotor is determined by a linear angular position sensor 6, processed by a signal processing block 7 and input to the control logics.

In block commutation, the commutation pattern changes at every block commutation event, in order to change the direction of the stator induced magnetic field. A high timing precision of the commutation event is required. Many angular sensors provide magnetic field raw values requiring signal post processing in order to determine the correct angular position. This processing takes time, making the determination of the commutation event imprecise. As the A/D conversion is on a typical A/D converter is not continuous there is also an undesirable time discretization leading to further error. In addition, scheduling jitter may heavily affect the time precision of the commutation event at high motor speeds. Impacts are torque ripple and lower efficiency.

Figure 2A:
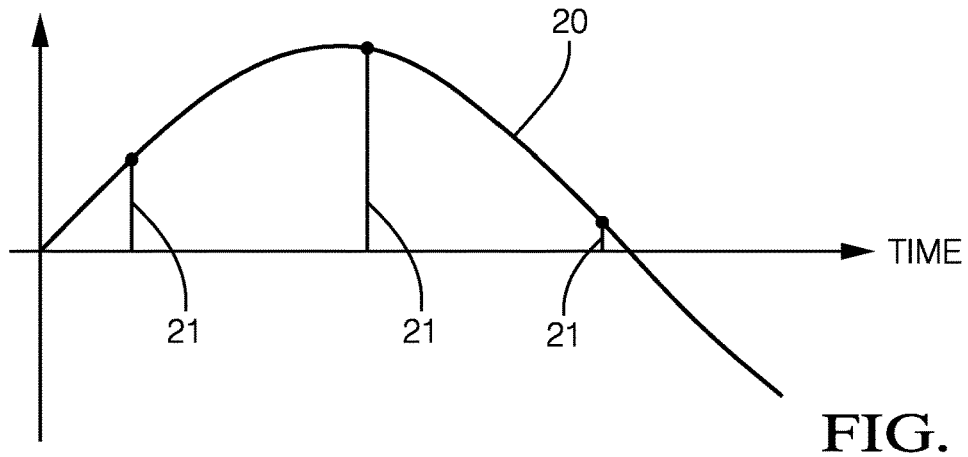
FIGS. 2a, 2b, 2c and 2d show the prior art methodology for determination of commutation time (event)
Figure 2B:
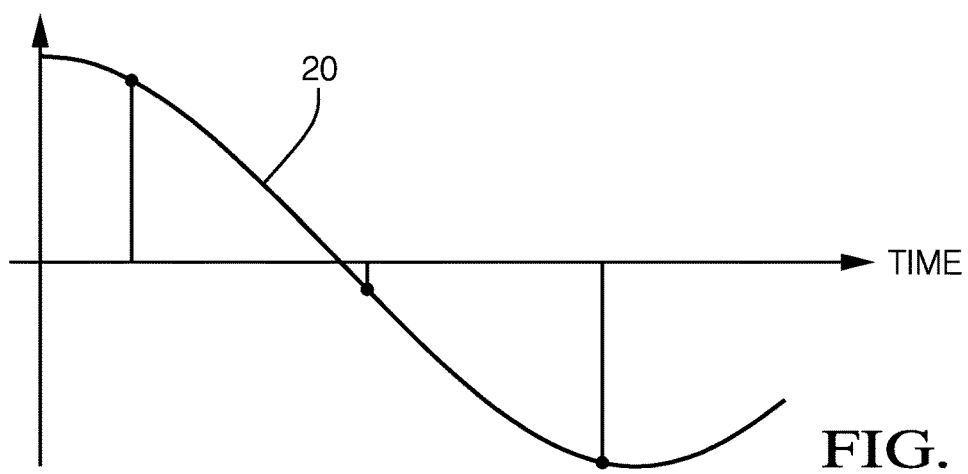
Figure 2C:
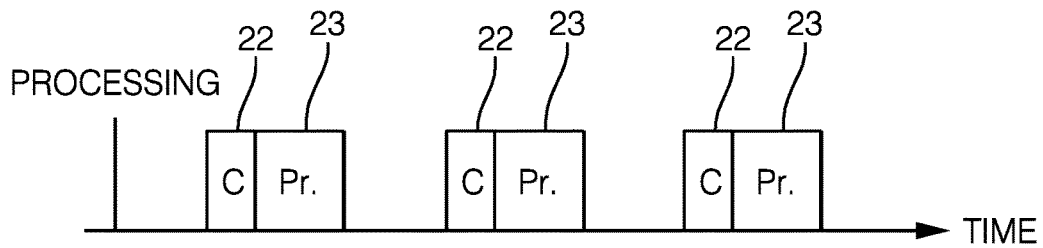
Figure 2D:
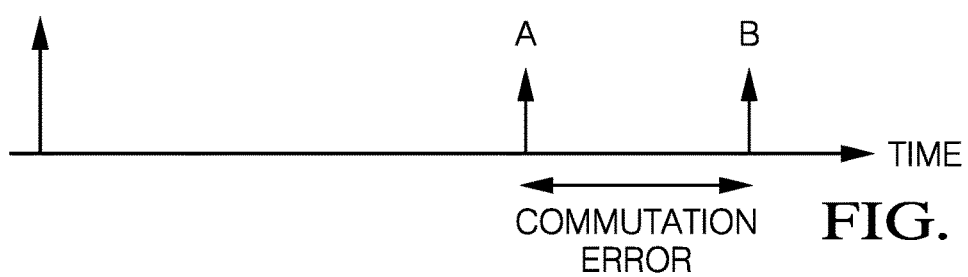

FIGS. 2a, 2b, 2c and 2d show the prior art methodology for determination of commutation time (event). FIGS. 2a and 2b show the output signals 20 from one or more sensors (e.g. two sensors), indicative of the rotational position of the motor. FIG. 2c shows the timeline of the processing of these signals. The signals are sampled at intervals e.g. periodically at time points 21. The signals are then converted to digital signals during time period 22 and processed during time periods 23 to determine the commutation timing. FIG. 2d shows an example of the commutation event timeline. Arrow A shows the optimal commutation timing event. However, this is not calculated (or rather able to be implemented) until the time indicated by the arrow B, due to sampling being late, as well as conversion and processing times. In order to overcome previously described issues, commonly a sensor package integrating the position processing and providing timing signals is used. Sometimes the processing speed of the logics is increased in order to limit the negative effects of jitter. Nevertheless, at high speeds, a reasonable dimensioned microcontroller system will always deal with commutation errors.

Aspects of the invention provide methodology to optimize timing precision of the commutation event in a very cost efficient way. In other aspects, the methodology may be implemented using microcontroller hardware.

Figure 3:
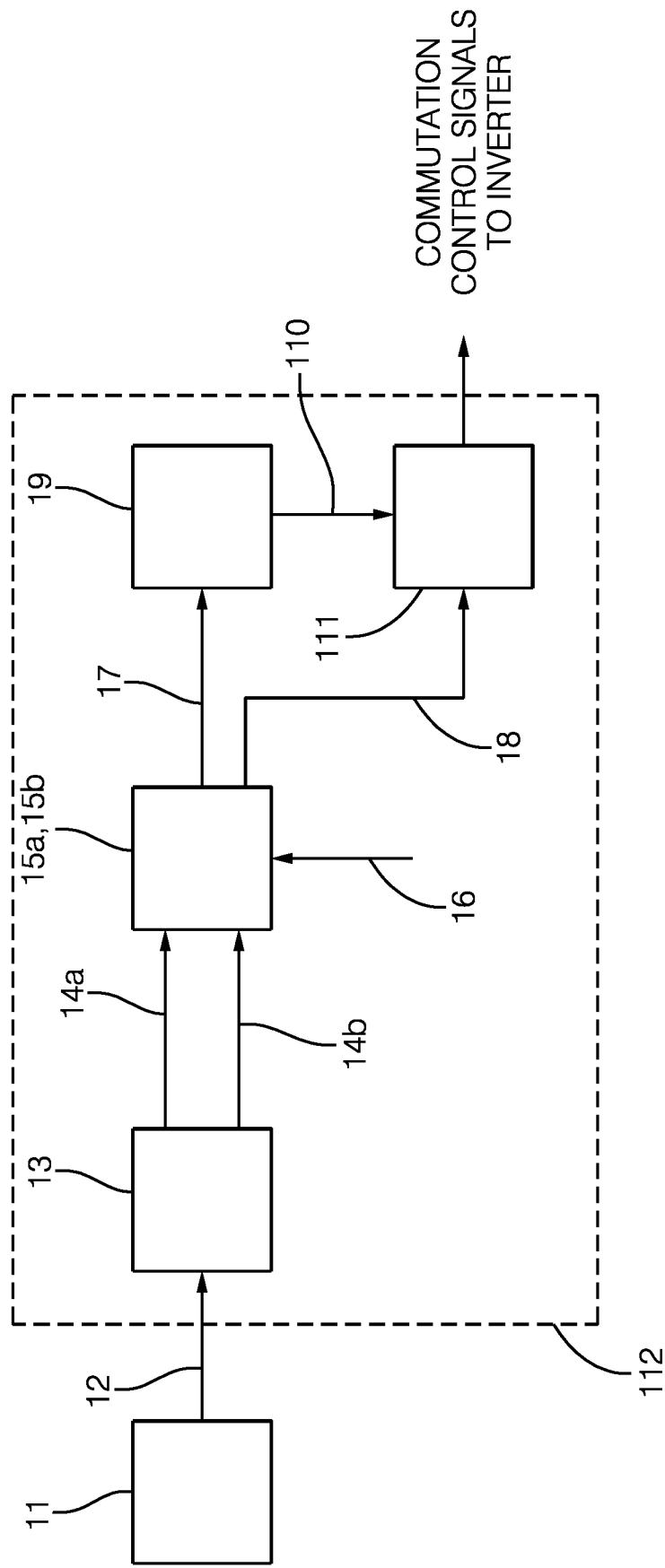
FIG. 3 shows specifically an example of the hardware/functional blocks used to examples of the invention.

FIG. 3 shows a block diagram of the hardware/functional blocks which may be used to implement examples of the invention. The entire signal chain from angular position sensor to the actual commutation in the inverter is optimized for the best possible commutation timing, while making use of an inexpensive linear output angular position sensor. FIG. 3 shows specifically an example of the hardware/functional blocks used to examples of the invention. Analog signals 12 provided by a sensor 11 are fed in the A/D converter module 13 of a microcontroller 112. If several analog signals are to be sampled, different options are possible: they can be sampled simultaneously with distinct A/D converters, or converted sequentially, potentially with a fixed delay. Simultaneous sampling simplifies the position signal logic—but this invention can be used with different setups as long as the position signal logic can calculate angle/timestamp pairs to be used for extrapolation.

The converted values of the analog signals are shown by reference 14a and the timestamp of the sampling event 14b are provided to the position signal processing logics 15a and commutation logic 15b. The output of commutation logic 15b is a timestamp 17 which is input to program a hardware timer 19 to provide an event 110 at $T_m$. Based on this event the inverter logic block 111 is provides commutation control signals to the inverter for the next commutation table entry (either in hardware or via interrupt or DMA). The problem of jitter and meeting the high precision timing of the block commutation event is solved by using the hardware timer module. A time stamp is sent to the commutation controller/inverter logic block 111 from block 15a/15b.

The precision problem of the position and speed estimation due to runtime and processing delays (especially at high motor speeds) is solved by doing processing and calculations in a time-based fashion on the processing sensor data at a (relative) known time in the past. From signal data and past commutation data provided at a previous times (e.g. with a corresponding, known times/time-stamps) the next commutation timing/event is determined.

The time stamp based calculation allows in addition lowering the CPU load at high speeds, because processing time and commutation angle error are uncorrelated.

EXAMPLE 1

Figures 4A, 4B:
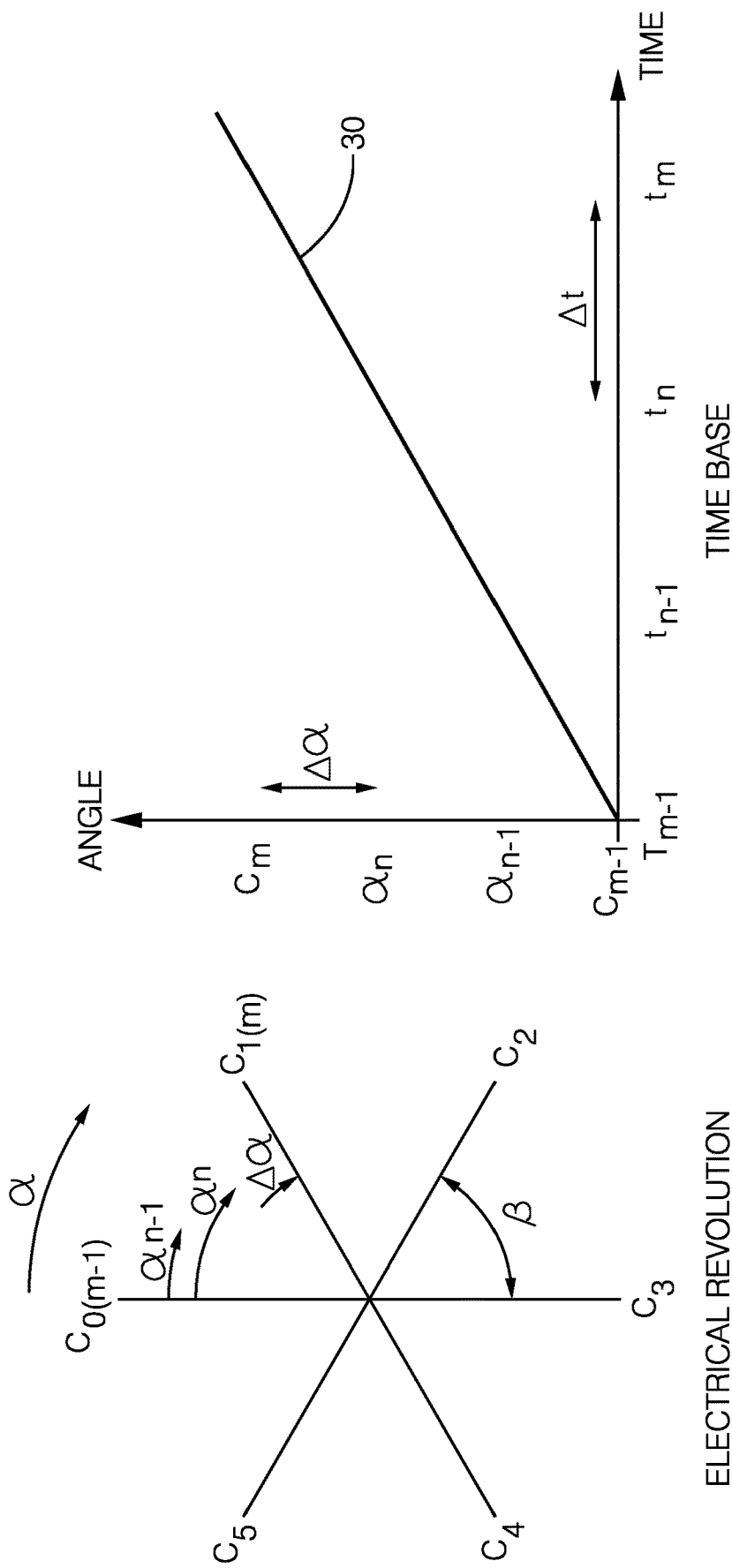
FIG. 4a shows a phasor or angular diagram showing computational timing of a BLDC motor and FIG. 4b shows the timeline therefor.

Methodology of aspects of the invention will now be described with reference to FIGS. 4a and 4b. FIG. 4a shows a phasor or angular diagram (with reference to electrical revolution) of a BLDC showing a series of ideal temporally arranged (clockwise) ideal commutation events $C_0$ $C_1$ $C_2$ $C_3$ $C_4$ $C_5$. The angle $\alpha$ can be regarded as a relative angle between rotor and stator. The angle $\beta$ illustrates the angular interval between commutation events, i.e. commutation times. In the example this occurs at fixed intervals/relative positions of 60°. FIG. 4b shows a plot 30 of motor position, in terms of angular displacement $\alpha$ against time. In the figure, it is assumed the previous commutation event occurred at Tm−1 at corresponding commutation event $C_{0(m-1)}$. The correct next commutation event/time is shown at time $T_m$ and is referred to as $C_1(m)$.

The sensor outputs from one or more sensors are sampled at a time $t_n$, to determine the angular position at the corresponding time-point e.g. $\alpha_n$. So in other words, the position signal is used (e.g. by logic circuitry) to computes the measured actual motor position $\alpha_n$ (see FIG. 3) at a past time-point $t_n$. A timestamp (representing $t_n$ may be determined by e.g. A/D conversion logic or A/D conversion trigger logic circuitry, and may originate from e.g. a hardware timer in the A/D converter, in A/D trigger logic circuitry or is latched in an interrupt or DMA.

The motor (angular) speed is also estimated. This may be based on one or more older timestamp position pairs $\alpha_{n-1}$/$t_{n-1}$ and/or modeling of the system. So for example the speed of the motor w can be determined from the equation $(\alpha_n - \alpha_{n-1})/(t_n - t_{n-1})$ To determine the next desired commutation event/time Tm for the next commutation ($C_m$), the method calculates the commutation time $T_m$ based on the past measured position $\alpha_n$, the timestamp $t_n$ of that past position and the instantaneous speed $\omega$ of the motor.

In the hardware, the timestamp may be is used to program a hardware timer 19 to provide an event 10 at $T_m$.

Based on this event the inverter is reconfigured e.g. in block 110 of FIG. 3 for the next commutation table entry (either in hardware or via interrupt or DMA). The problem of jitter and meeting the high precision timing of the block commutation event is solved by using the hardware timer module.

So in summary, the next commutation event is ($T_m$) is a function of $t_n$, $\alpha_n$, and $\omega$.

The time of the next commutation event Tm may be $$T_m = t_n + (C_{m,angle} - \alpha n)/\omega$$

where $C_{m,angle}$ is the next commutation angle.

Of course, the skilled person would be readily aware of other methods or variation which use these basic parameters to determine the timing of the next commutation even.

Extrapolation methodology may optionally be enhanced to compensate for acceleration (measured or estimated based on a model):

$$T_m = t_n + \frac{C_m - \alpha_n}{\omega(M) + A(M)},$$

where A(M) is the acceleration derived from the model M

External parameters parameters 16 may be input to block 15a/15b in FIG. 3 in order to increase the precision of the calculation model.

If necessary the timestamps may need to be converted between the A/D converter and event timer domains. For this invention no common hardware timer is needed between the event generation and the A/D converter—both timers may in practice run at different clock and have an offset. For the same commutation event $T_m$ the hardware timer value may be updated several times in order to increase accuracy.

The invention claimed is:

1. A method of controlling commutation of a brushless direct current motor, said method comprising:
providing one or more sensors, said one or more sensors being adapted to provide a variable output dependent on a rotational angle of the brushless direct current motor or a relative position of a stator and a rotor of the brushless direct current motor;
sampling the variable output from said one or more sensors at a known time $t_n$ between a past commutation event $C_{m-1}$ and a next commutation event $C_m$ to be implemented;
determining, based on the sampling, an angular position $\alpha_n$ between the rotor and the stator at the known time $t_n$;
determining a time $T_m$ of the next commutation event $C_m$ based on said known time $t_n$, an estimated instantaneous motor speed $\omega$ at the known time $t_n$, and the angular position $\alpha_n$; and
providing the time $T_m$ of the next commutation event $C_m$ to a hardware timer to provide the next commutation event $C_m$ at time $T_m$.

2. The method as claimed in claim 1, wherein the determining the time $T_m$ is further based on a next commutation angle $C_{m,angle}$.

3. The method as claimed in claim 1, wherein the time $T_m$ is determined from the equation:

$$T_m = t_n + (C_{m,angle} - \alpha_n)/\omega$$

where $C_{m,angle}$ is an angle of the next commutation event $C_m$.

4. The method as claimed in claim 1, wherein the estimated instantaneous motor speed $\omega$ of the brushless direct current motor is determined by determining an angular change in rotation of the brushless direct current motor from the sampled variable output of the one or more sensors at known time $t_n$ and at a time $t_{n-1}$ of past commutation event $C_{m-1}$.

5. The method as claimed in claim 1, where the estimated instantaneous motor speed $\omega$ of the brushless direct current motor is determined from a model of the brushless direct current motor.

6. The method as claimed in claim 1, wherein:
the time $T_m$ is determined from the equation:

$$T_m = t_n + (C_{m,angle} - \alpha_n)/\omega$$

where $C_{m,angle}$ is an angle of the next commutation event $C_m$; and
the estimated instantaneous motor speed $\omega$ of the brushless direct current motor is determined by determining an angular change in rotation of the brushless direct current motor from the sampled variable output of the one or more sensors at known time $t_n$ and at a time $t_{n-1}$ of past commutation event $C_{m-1}$.

7. A method comprising, performing, by a controller, operations including:
receiving a signal from a sensor configured to sense a position of a rotor of a brushless direct current motor;
providing a timestamp with the received signal indicating a time the position of the rotor was sensed;
determining an angular position of the rotor at the time of the timestamp, based on the received signal;
estimating a rotation speed of the rotor at the time of the timestamp, based on the determined angular position of the rotor at the time of the timestamp and a previously determined angular position of the rotor at a previous time;
determining a next time for a next change of a commutation of the brushless direct current motor, based on the time of the timestamp, the determined angular position of the rotor, and the estimated rotation speed of the rotor;
providing the determined next time for the next change of the commutation to a hardware timer of the controller; and
controlling the next change of the commutation of the brushless direct current motor based on an output of the hardware timer according to the determined next time.

8. An apparatus comprising a controller configured to:
receive a signal from a sensor configured to sense a position of a rotor of a brushless direct current motor;
provide a timestamp with the received signal indicating a time the position of the rotor was sensed;
determine an angular position of the rotor at the time of the timestamp, based on the received signal;
estimate a rotation speed of the rotor at the time of the timestamp, based on the determined angular position of the rotor at the time of the timestamp and a previously determined angular position of the rotor at a previous time;
determine a next time for a next change of a commutation of the brushless direct current motor, based on the time of the timestamp, the determined angular position of the rotor, and the estimated rotation speed of the rotor;
provide the determined next time for the next change of the commutation to a hardware timer of the controller; and
control the next change of the commutation of the brushless direct current motor based on an output of the hardware timer according to the determined next time.

9. The apparatus of claim 8, wherein the controller further comprises:
an analog to digital converter configured to receive the signal from the sensor in analog form, convert the received signal to a digital signal, and generate the timestamp.

10. The apparatus of claim 9, wherein the controller further comprises:
a position signal and commutation processor configured to receive the digital signal and timestamp from the analog to digital converter, and determine the next time for the next change of the commutation of the brushless direct current motor.

11. The apparatus of claim 10, wherein the position signal and commutation processor is further configured to receive external parameters to increase a precision of the determination.

12. The apparatus of claim 10, wherein the hardware timer of the controller is configured to receive the determined next time for the next change of the commutation of the brushless direct current motor from the position signal and commutation processor, and generate an event at the determined next time.

13. The apparatus of claim 12, wherein the controller further comprises an inverter logic block configured to receive the generated event from the hardware timer, and provide a commutation control signal to an inverter for a next commutation table entry to control the next change of the commutation of the brushless direct current motor.

14. The apparatus of claim 13, wherein the inverter logic block is further configured to receive the timestamp from the position signal and commutation processor.

\* \* \* \* \*